US011137000B2

(12) United States Patent
Chester

(10) Patent No.: US 11,137,000 B2
(45) Date of Patent: Oct. 5, 2021

(54) SELF-CONTAINED ENERGY EFFICIENT HYDRAULIC ACTUATOR SYSTEM

(71) Applicant: MEA Inc., Elk Grove Village, IL (US)

(72) Inventor: Mark Vincent Chester, West Dundee, IL (US)

(73) Assignee: MEA Inc., Elk Grove Village, IL (US)

( * ) Notice: Subject to any disclaimer, the term of this patent is extended or adjusted under 35 U.S.C. 154(b) by 502 days.

(21) Appl. No.: 14/511,463

(22) Filed: Oct. 10, 2014

(65) Prior Publication Data

US 2016/0102685 A1 Apr. 14, 2016

(51) Int. Cl.
| | | |
|---|---|---|
| *F15B 11/00* | (2006.01) | |
| *F15B 7/00* | (2006.01) | |
| *F15B 15/28* | (2006.01) | |
| *F15B 1/26* | (2006.01) | |
| *F15B 15/18* | (2006.01) | |

(52) U.S. Cl.
CPC ............ *F15B 11/003* (2013.01); *F15B 7/006* (2013.01); *F15B 15/2815* (2013.01); *F15B 1/265* (2013.01); *F15B 15/18* (2013.01); *F15B 2211/20515* (2013.01); *F15B 2211/20561* (2013.01); *F15B 2211/27* (2013.01); *F15B 2211/3058* (2013.01); *F15B 2211/30515* (2013.01); *F15B 2211/31529* (2013.01); *F15B 2211/633* (2013.01);
(Continued)

(58) Field of Classification Search
CPC ... F15B 11/003; F15B 11/0423; F15B 11/055; F15B 13/01; F15B 13/044; F15B 15/18; F15B 15/28; F15B 2211/27; F15B 2211/20561; F15B 2211/30515; F15B 2211/50545; F15B 2211/6336; F15B 2211/705

USPC .......................................................... 60/473
See application file for complete search history.

(56) References Cited

U.S. PATENT DOCUMENTS 2,640,323 A 6/1953 McLeod
2,640,426 A 6/1953 McLeod
(Continued)

FOREIGN PATENT DOCUMENTS

CN 104019278 A 9/2014
EP 2 708 661 A1 3/2014
(Continued)

OTHER PUBLICATIONS

PCT Notification of Transmittal of the International Search Report and the Written Opinion of the International Searching Authority, or the Declaration with accompanying PCT International Search Report and PCT Written Opinion of the International Searching Authority dated Jan. 13, 2016.
(Continued)

*Primary Examiner* — Thomas E Lazo
(74) *Attorney, Agent, or Firm* — Locke Lord LLP; Peter J. Fallon; Nicholas J. DiCeglie, Jr.

(57) ABSTRACT

The self-contained energy efficient hydraulic actuator system of the present invention includes a hydraulic cylinder, a servo motor that is configured to produce rated torque from zero RPM to maximum rated RPM with rotor speed/position feedback to a servo motor, a pump, and a solenoid valve that enables the hydraulic cylinder to maintain its position without the motor running. The system has the ability to hold a load in place without motor operation via the use of the solenoid valve, and therefore saves energy and extends the motor lifetime by minimizing the motor running time.

29 Claims, 2 Drawing Sheets

(52) U.S. Cl.
CPC ............... *F15B 2211/6336* (2013.01); *F15B 2211/6651* (2013.01); *F15B 2211/6653* (2013.01); *F15B 2211/6656* (2013.01); *F15B 2211/6658* (2013.01); *F15B 2211/7054* (2013.01); *F15B 2211/765* (2013.01); *F15B 2211/851* (2013.01); *F15B 2211/853* (2013.01); *F15B 2211/88* (2013.01); *Y02P 80/10* (2015.11)

(56) References Cited

U.S. PATENT DOCUMENTS

| | | | |
|---|---|---|---|
| 4,625,513 A | 12/1986 | Glomeau | |
| 4,766,728 A | 8/1988 | Glomeau | |
| 5,141,402 A * | 8/1992 | Bloomquist | B29C 45/82 |
| | | | 417/217 |
| 5,144,801 A | 9/1992 | Scanderbeg et al. | |
| 5,422,808 A | 6/1995 | Catanese, Jr. et al. | |
| 5,741,166 A | 4/1998 | Newman | |
| 5,778,671 A * | 7/1998 | Bloomquist | F15B 21/087 |
| | | | 417/371 |
| 5,819,574 A | 10/1998 | Yogo | |
| 6,089,269 A | 7/2000 | Essam | |
| 6,126,401 A * | 10/2000 | Latham | F15B 15/17 |
| | | | 417/16 |
| 6,176,247 B1 | 1/2001 | Winchcomb et al. | |
| 6,282,893 B1 * | 9/2001 | Porter | F15B 1/265 |
| | | | 60/477 |
| 6,543,223 B2 * | 4/2003 | Muschong | B25B 5/061 |
| | | | 60/476 |
| 6,625,982 B2 | 9/2003 | Van Den Bossche et al. | |
| 6,796,120 B2 * | 9/2004 | Franchet | F15B 7/006 |
| | | | 60/413 |
| 6,892,534 B2 | 5/2005 | Silva et al. | |
| 7,059,338 B1 | 6/2006 | Kincaid et al. | |
| RE39,158 E | 7/2006 | Duff | |
| 7,079,021 B2 | 7/2006 | Snowbarger et al. | |
| 7,434,395 B2 | 10/2008 | He | |
| 7,640,736 B2 | 1/2010 | Arbel et al. | |
| 8,214,120 B2 | 7/2012 | Kothari et al. | |
| 8,336,613 B2 | 12/2012 | Ramsey et al. | |
| 8,783,648 B2 | 7/2014 | Hanson et al. | |
| 9,080,683 B2 | 7/2015 | Carter et al. | |
| 9,103,233 B2 | 8/2015 | Shapiro et al. | |
| 9,254,841 B2 | 2/2016 | Fehling et al. | |
| 9,506,225 B2 | 11/2016 | Kim | |
| 2003/0188530 A1 | 10/2003 | Inoue et al. | |
| 2005/0189017 A1 | 9/2005 | Eryurek | |
| 2007/0017220 A1 | 1/2007 | Arbel et al. | |
| 2007/0101711 A1 | 5/2007 | Debus | |
| 2008/0309032 A1* | 12/2008 | Keane | B60G 17/0162 |
| | | | 280/5.509 |
| 2009/0174255 A1 | 7/2009 | Dahlberg et al. | |
| 2014/0014861 A1 | 1/2014 | Saruwatari et al. | |
| 2014/0230643 A1 | 8/2014 | Kim | |

FOREIGN PATENT DOCUMENTS

| | | |
|---|---|---|
| EP | 2 767 720 A1 | 8/2014 |
| JP | 2003-074606 | 3/2003 |
| JP | 2003-136288 | 5/2003 |
| JP | 2003-139108 | 5/2003 |
| JP | 2009-092110 A | 4/2009 |
| KR | 10-2014-0079381 | 6/2014 |
| WO | WO 2014/074713 A1 | 5/2014 |

OTHER PUBLICATIONS

Catalog HY22-1121/US. Online Datasheet. Parker Hannifin Corporation (2008). Retrieved from the internet at http://www.parkermotion.com/bbs/MPP/MPP_MPJ_Catalog_02_04_08.pdf and retrieved on Dec. 4, 2015.

MPP_MPJ_Catalog_02_04_08. Online Datasheet. Parker Hannifin Corporation (2005) Retrieved from the internet at http://www.parker.com/literature/Olidyne/Olidyne%20-%20PDF%20Files/HY22_1121US_Catalog.pdf and retrieved on Dec. 4, 2015.

Brochure: The M.E.A., Inc. Goldline Actuator™ Series (4 pages) 2007.

Brochure: M.E.A. Super Thrust Modulating Valve Actuators (1 page) 1971.

Complaint; *Rexa, Inc., Plaintiff* v. *Mark Vincent Chester and MEA Inc., Defendants*, Civil Action No. 17 CV 8716 dated Dec. 4, 2017; pp. 1-15.

Instruction Book Index; M.E.A. Valve Positioner System; Houston Instruments P.O. V4524-4422; M.E.A. 4013 dated Feb. 12, 1981; pp. 1-9.

Notification of Reasons for Refusal issued by the Japanese Patent Office dated Mar. 15, 2018 in Japanese language and its English translation.

Korean Non-Final Office Action (Grounds of Rejection) dated Jun. 18, 2018.

European Communication with extended European Search Report pursuant to Rule 62 EPC, the supplementary search report (Art. 153(7) EPC) and the European search opinion dated Jun. 4, 2018.

European Communication pursuant to Rules 70(2) and 70a(2) EPC dated Jun. 21, 2018.

NRD Instruction Manual—1997, pp. 1-127.

NRD Instruction Manual—1999, pp. 1-64.

Second Japanese Office Action dated Nov. 29, 2018 in Japanese and English language.

Second Chinese Office Action dated Nov. 7, 2018 in Chinese Language.

First Korean Office Action dated Jun. 18, 2018 in Korean language (6 Pages) and English language (7 pages).

First Chinese Office Action dated Feb. 26, 2018 in Chinese language (5 pages) and English Language (6 pages).

First Canadian Office Action dated Jan. 29. 2018 (12 pages).

Voith Turbo H + L Hydraulic GmbH & Co. KG, "Servo Drive CLDP—Control Principle: Speed and Pressure Control Integrated in the Servo Converter," (12 pages), Aug. 2013.

Rotork Fluid Systems, "Skilmatic Range—Electro-Hydraulic Self-Contained Failsafe Actuators," (16 pages), Publication F700E, Issue 10/10.

Camtorc Limited, "Self-contained Electro-Hydraulic Failsafe Actuator," (2 pages), Jan. 2001.

Memorandum in Support or Rexa's Motion for Summary Judgement dated May 1, 2019, Case: 1:17-cv-08716, *Rexa, Inc.* v. *Mark Vincent Chest and MEA Inc.*, pp. 1-59.

Rexa's Statement Pursuant to Local Rule 56.1 of Material Facts as to Which there is no Genuine Issue Entitling Rexa jto a Judgment as a Matter of Law dated May 1, 2019, Case: 1:17-cv-08716, *Rexa, Inc.* v. *Mark Vincent Chester and MEA Inc.*, pp. 1-36.

Exhibit 3 to REXA's Motion for Summary Judgment, Defendant M.E.A., Inc.'s Answer to Amended Complaint and Affirmative Defenses, dated Jan. 30, 2018.

Exhibit 6 to REXA's Motion for Summary Judgment, Defendant Mark Chester's Amended ; Answer and Affirmative Defenses to Plaintiff REXA, Inc.'s Amended Complaint, dated Jan. 30, 2018.

Exhibit 10 to REXA's Motion for Summary Judgment, REXA Xpac Installation and Operation Manual, Version 5.1, dated May 2008, Apr. 2009 and May 2009.

Exhibit 11 to REXA's Motion for Summary Judgment, Declaration of Ralph Goldsmith in Support of REXA's Motion for Summary Judgment, dated Apr. 29, 2019.

Exhibit 15 to REXA's Motion for Summary Judgment, REXA Brochure, dated Mar. 2002.

Exhibit 18 to REXA's Motion for Summary Judgment, Deposition Transcript of Michael Brennan, dated Aug. 17, 2018.

Exhibit 32 to REXA's Motion for Summary Judgment, Sun Hydraulics Technical Tips, dated Jun. 16, 2014.

Exhibit 33 to REXA's Motion for Summary Judgment, HydraForce Brochure, Copyright 2015, Original date unknown.

Exhibit 34 to REXA's Motion for Summary Judgment, Wandfluh Hydraulics + Electronics Brochure, dated Jan. 11, 2010.

(56) References Cited

OTHER PUBLICATIONS

Exhibit 36 to REXA's Motion for Summary Judgement, Camtorc Brochure, dated 2001.
Exhibit 38 to REXA's Motion for Summary Judgment, Rotork Fluid Systems, dated Oct. 2010.
Exhibit 41 to REXA's Motion for Summary Judgment, Piisma Brochure, Internet date Nov. 17, 2018, Originai date unknown.
Exhibit 85 to REXA's Motion for Summary Judgement, REXA Technical Memo, dated Nov. 2013.
Third Chinese Office Action date May 27, 2019 in Chinese Language and English Language.
Reference Book 1: Motor and Control, Section II: Serevo motor; III: Comparison between Servo motor and step moto; paragraphs 5. And 6.; dated Apr. 30, 2011 in English abstract and Chinese Language.
Reference Book 2: Cement Data Book; vol. 2; p. 21; 1-9-4 Driving motor having double stators and adjustable torque; dated Sep. 30, 1986 in English abstract and Chinese Language.
Reference Book 3; Hou Quingquan et al., "Hydraulic Transmission of Coal Mine Machinery," Harbin Engineering University Press, first edition, dated Dec. 31, 2013 in English abstract and Chinese Language.
First Office Action for Indian Patent App. No. 201737013985, dated Jul. 16, 2019, 6 pages.
Memorandum Opinion of Rexa's Motion for Summary Judgment dated Sep. 10, 2020, Case: 1:17-cv-08716, *Rexa, Inc. v. Mark Vincent Chester and MEA Inc.*, pp. 1-34.
Examiner Requisition dated Jun. 29, 2020 corresponding to Canadian Application No. 2,972,824.
Reinstatement dated Jun. 12, 2020 corresponding to Canadian Application No. 2,972,824.

\* cited by examiner

SELF-CONTAINED ENERGY EFFICIENT HYDRAULIC ACTUATOR SYSTEM

BACKGROUND

The invention disclosed and taught herein generally relates to self-contained actuator systems and, in particular, to a self-contained energy efficient hydraulic actuator system.

An actuator is the mechanism by which a control system acts upon an environment. It is operated by a source of energy typically an electric current, a motor, and hydraulic fluid pressure or pneumatic pressure, which converts that energy into motion.

A hydraulic actuator typically consists of a cylinder that uses hydraulic power to facilitate mechanical operation. The mechanical motion gives an output in terms of linear, rotary or oscillatory motion. The hydraulic cylinder consists of a hollow cylindrical tube along which a piston can slide. The term double acting is used when pressure is applied on each side of the piston. A difference in pressure between the two sides of the piston results in motion of piston to either side. The term single acting is used when the fluid pressure is applied to just one side of the piston. If the piston moves in only one direction, a spring being frequently used to give the piston a return stroke.

Conventionally, a hydraulic linear actuator is connected to a remote supply of pressurized hydraulic fluid through a closed network of pipes and control valves. However, there are applications where it is desirable for a hydraulic linear actuator to be freestanding and mobile, having a prime mover, hydraulic pump, and a closed hydraulic fluid control system all integrated with and located proximate to the linear actuator. Such compact freestanding actuators are particularly suitable for industrial valve applications and remote locations where such valves may be located.

Prior art freestanding hydraulic actuators are disclosed in U.S. Pat. Nos. 2,640,323 and 2,640,426 to McLeod; U.S. Pat. No. 5,144,801 to Scanderbeg et al.; U.S. Pat. No. 8,336,613 to Ramsey et al.; and U.S. Pat. No. 6,892,534 to Silva et al.

Self-contained hydraulic actuator systems having closed hydraulic systems can incorporate a servo valve. The servo valve alters the direction of the fluid in the system, and thus controls the movement of a double acting hydraulic cylinder. One of the drawbacks of using the servo valve to change the fluid direction is the servo valves' continuous internal leakage that requires a continuous supply of hydraulic fluid from the prime mover driven pump. Hydraulic servo valves may also fail because of particulate contamination that can be carried into the tight clearances between the moving components of a servo valve.

Self-contained hydraulic actuator systems can also incorporate hydraulic pumps (e.g., a bi-directional hydraulic pump). These systems require bi-directional motors to drive the hydraulic pump. The movement of a double acting hydraulic cylinder is controlled by the speed and direction of the hydraulic pump as fluids flow through the system.

Published U.S. Patent Application No. 2007/0101711 to Debus discloses the use of an AC induction motor driven by a variable frequency drive (VFD), and the hydraulic pump speed and directions are controlled by the motor. However, a VFD driven motor has limited torque available at low RPM, may not start under load, and resists rapid RPM and direction changes. Even though the Debus application discloses the use of a bypass leak path which allows the motor to run at some minimum RPM when the actuator is stationary, the motor is required to run continuously even under the hold position because there is no separate provision for load locking. The continuous running of the motor results in expenditure of unnecessary energy, shortened life of the motor, frequent repairs and ultimately extra cost.

U.S. Pat. No. 7,640,736, to Arbel, describes a hydraulic linear actuator system including a pump that is configured to rotate in a single direction at a substantially constant velocity. Arbel uses a single direction motor, and a bi-directional stepper motor to change the direction of the pump and flow of fluid. Both the direction and flow rate of fluid is controlled by adjusting the positional relationship between the stator and the rotor of the pump. However, Arbel fails to provide for load locking. Another drawback of Arbel is that both the pump and prime mover must run in order to maintain a static actuator position.

Scanderbeg et al., U.S. Pat. No. 5,144,801, discloses a freestanding electro-hydraulic actuator having an electric motor disposed in a hydraulic fluid reservoir and connected to drive a hydraulic fluid pump. Scanderberg discloses that the electric motor drives the hydraulic pump "on demand." On demand basis is associated with motor speed changes "generating only the required pressure and flow," but does not cycle on and off. When the actuator achieves desired position, the motor slows down, but continues to run slowly to maintain position. Scanderberg fails to provide a separate provision for load locking.

Duff, U.S. Pat. RE39,158, discloses a hydraulic system manifold having a body, a counterbalance in the body and a flow controller in the body. Duff's patent is directed to an actuator that provides load locking without use of the motor through the use of a manifold having counterbalance and mechanical flow locking valves. Duff's flow locking valves operate on system or line pressure and hold the actuator in place when the motor is off. However the pilot operated check valves introduce positioning resolution issues. Glomeau, U.S. Pat. No. 4,766,728, overcomes the pilot operated check valve positioning resolution issues with the disclosure of the Flow Matching Valve.

There are a number of drawbacks associated with the disclosures in the prior art. One major drawback is that the actuator holding ability is wholly dependent on continuous operation of the prime mover or mechanical control valves to lock fluid in the hydraulic cylinder. Conventional freestanding hydraulic linear actuators do not normally have the necessary motor, pump, and/or valve configuration to accomplish the task of load locking, and thus depend on the prime mover to maintain fluid pressure for load locking. This increases power consumption and reduces component life as the prime mover and pump are needed to operate continuously.

Another major drawback is that prime mover and pump operate frequently and in some applications, continuously to make up for the servo valve leakage rate. This greatly limits actuator frequency response and positioning accuracy and repeatability.

Thus, there is a need in the art to provide an energy efficient actuator system that can be operated in any orientation, which provides for load locking, without the need of a servo valve, and where the system has the capability to stop the motor at the stationary state of the piston, and to restart the motor from zero RPM under load.

SUMMARY

The present disclosure is directed to a self-contained energy efficient hydraulic actuator system. The prime mover (motor), hydraulic reservoir, and all other hydraulic components are all integrated together and form a Hydraulic Power Source (HPS). The system inventively holds a load in place without motor operation utilizing at least one solenoid valve and preferably two solenoid valves. In particular, the present invention provides a bi-directional hydraulic pump which is operationally coupled to a servo motor. A controller, in conjunction with the hydraulic pump/servo motor and solenoid valves, sequence flow operations. The servo motor and bi-directional hydraulic pump accordingly operate to control fluid flow and direction, whereas the solenoid valves perform the lock function of the actuator system.

In accordance with the present invention, the resulting speed of the actuator is a function of the displacement of the hydraulic pump and displacement of the hydraulic cylinder.

In a first embodiment, the disclosed self-contained energy efficient hydraulic actuator system includes at least one piston and at least one bi-directional hydraulic pump in fluid communication with the piston to provide hydraulic fluid to the piston and to control the position of the piston. The bi-directional hydraulic pump having at least one hydraulic fluid inlet and at least one hydraulic fluid outlet and a servo motor operatively coupled to the pump to drive the pump, with at least one solenoid valve configured to control the hydraulic fluid between the piston and the bi-directional pump. The actuator system having a controller (controller unit) for controlling the solenoid valve and servo motor, so that the position of the piston can be maintained when the servo motor is not driving the pump.

Preferably, the hydraulic cylinder has a double rod ended piston, which provides equal annular area or chambers formed in the hydraulic cylinder on both faces of the piston to minimize the displaced volume difference when the piston moves to either direction in the cylinder.

According to another preferred embodiment, the bi-directional hydraulic pump in the first preferred embodiment is a reversible gear pump.

According to another preferred embodiment, a smooth or pulseless output from the bi-directional hydraulic pump is required.

According to yet another preferred embodiment, the solenoid valve in the first preferred embodiment is configured to hold a load without the servo motor running.

According to yet another preferred embodiment, the servo motor in the first preferred embodiment is an AC brushless permanent magnet motor, According to yet another preferred embodiment, the first preferred embodiment the controller comprises a control electronics unit and servo drive unit configured to send and receive control signals to the servo motor feedback unit of the servo motor, solenoid valves, and a position sensor that is attached to the hydraulic cylinder and is configured to sense a position of the actuator/piston/rod and hydraulic cylinder.

According to yet another preferred embodiment, the first preferred embodiment further includes a sealed reservoir that is configured to make up for volume change due to thermal expansion and contraction of the hydraulic fluid and the system.

According to still another embodiment the invention provides a method of reducing the energy consumption of a hydraulic actuator system having a servo motor and at least one solenoid valve. The method comprising the steps of receiving, at a controller, input signals corresponding to a desired operation of the functions of the system, determining by the controller an operating limit (i.e., a position, of the actuator/piston/rod) for the system; and controlling the servo motor and solenoid valve simultaneously at the operating limit. The hydraulic actuator system of the method having at least one piston; at least one bi-directional hydraulic pump in fluid communication with the piston to provide hydraulic fluid to the piston and to control the position of the piston, the pump having at least one hydraulic fluid inlet and at least one hydraulic fluid outlet; a servo motor operatively coupled to the pump to drive the pump; at least one solenoid valve configured to control the hydraulic fluid between said piston and said bi-directional pump, and said controller controls the solenoid valve and servo motor, wherein the position of the piston can be maintained when the servo motor is not driving the pump.

It will be seen that the several advantages of the invention are achieved and attained by the hydraulic actuator system of the present invention including the ability to hold load in place without servo motor operation via the use of solenoid valves, the ability to produce torque from zero RPM to a maximum RPM, and the ability to start from zero RPM under load. Notably, at zero RPM, the servo motor does not utilize energy resulting in energy savings and extending the servo motor lifetime while minimizing servo motor running time. The actuator of the present invention may further change RPM and direction rapidly and continuously without duty cycle limitations.

Another advantage of the invention is the ability to control the hydraulic fluid pressure by regulating power input to the hydraulic pump by controlling the prime mover (i.e., the servo motor) power, thus eliminating the need for mechanical pressure regulation.

Another advantage of the invention is that the actuator output speed is controlled electronically by means of variable speed servo motor. This allows variable acceleration, speed and deceleration to optimize performance for each individual application.

Another advantage is the low energy consumption and extended life of the prime mover (i.e., servo motor) that only operates when actuator is moving, as the servo motor speed is proportional to required actuator movement.

BRIEF DESCRIPTION OF THE DRAWINGS

The invention is herein described, by way of example only, with references to the accompanying drawings, wherein.

DETAILED DESCRIPTION

Figure 1:
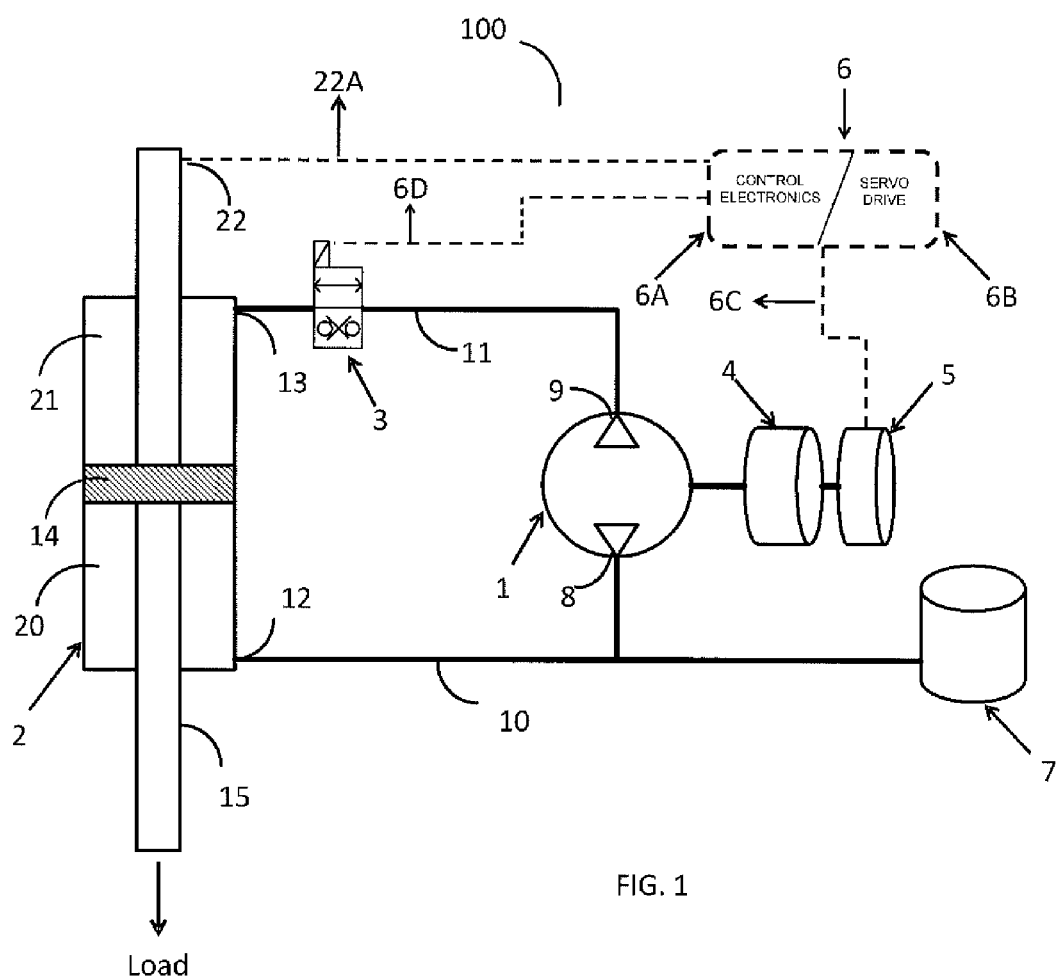
FIG. 1 is a schematic view of a preferred embodiment of a self-contained energy efficient hydraulic actuator system.

The present invention is a self-contained energy efficient hydraulic actuator system 100 having a servo motor 4 and bi-directional hydraulic pump 1, the pumping assembly of which is adjustable so as to control the speed and direction of the fluid flow through the system and a hydraulic cylinder 2 that is responsive to the fluid flow.

The present invention provides a hydraulic system that includes at least one actuator, i.e., hydraulic cylinder 2 with piston 14 and rod 15, having at least one hydraulic fluid input and at least one hydraulic fluid output via a first cylinder port 12 (inlet) and a second cylinder port 13 (inlet), for ingress or egress of hydraulic fluid, at least one bi-directional hydraulic pump 1 in fluid communication with the hydraulic cylinder 2 to provide hydraulic fluid to the hydraulic cylinder 2 and to control the position of the rod 15, a servo motor 4 operatively coupled to the bi-directional hydraulic pump 1 to drive the hydraulic pump 1, and a controller unit 6 for controlling the hydraulic actuator system 100. The actuator output and speed is controlled electronically by means of controller unit's 6 control electronics unit 6A varying the speed of the servo motor 4 via the servo drive unit 6B. This allows for variable acceleration, speed and deceleration to optimize performance for each individual application.

The bi-directional hydraulic pump 1 and servo motor 4 are directly and continuously coupled. A smooth or pulseless output from the bi-directional pump 1 is preferred. In this regard, a piston type pump would be problematic because of the pressure/flow pulses. It is a one to one coupling ratio, meaning the bi-directional hydraulic pump's 1 RPM and direction always equals the servo motor's RPM and direction. The hydraulic actuator system 100 can use different size servo motors and bi-directional hydraulic pumps with varying displacements. For example, servo motors having a rated horsepower of 0.25, 0.81, and 1.64 hp, as well as rated torque of 3.9, 12.77, and 25.87 inch pounds, respectively. Bi-directional hydraulic pumps that would be useful with the above described motors included those, for example, having a displacement of 0.0098, 0.0321, and 0.065 cubic inches per revolution, respectively. The servo motor 4 and hydraulic pump 1, do not necessarily require connecting gears or a transmission, but can be adapted as needed.

Hydraulic fluid pressure is controlled or limited by regulating power input to the bi-directional hydraulic pump 2 by controlling the servo motor 4 power. The bi-directional hydraulic pump 1 has at least two ports, i.e., a first port 8 and a second port 9, and is capable of pumping fluid in either directions through the ports (for egress or ingress of hydraulic fluid). The bi-directional hydraulic pump 1 is operably connected to a hydraulic cylinder 2. As the bi-directional hydraulic pump 1 pumps the hydraulic fluid out the hydraulic fluid drives the hydraulic cylinder's 2 piston 14 and rod 15, and controls the movement and position of the hydraulic actuator system 100 by altering the difference in pressure.

As used herein a servo motor 4 includes any motor that responds to a control signal by changing its speed or other operating parameters. In accordance with this invention, a servo motor 4 is used to control the bi-directional hydraulic pump 1. The servo motor 4 has the ability to reverse direction, to vary speed, and to maintain fixed RPM, instantaneously and continuously. The servo motor 4 is configured to produce rated torque from zero RPM to a maximum rated RPM under load.

As used herein, the controller unit 6, which comprises the control electronic 6A and servo drive unit 6B monitors the position feedback signal from a position sensor 22 located on the hydraulic cylinder 2 and continually adjusts for deviation from expected behavior. Many types of devices can be considered for use as the position sensor 22. For example, a potentiometer can be used as position sensor 22. A servo drive unit 6B is used to operate the servo motor 4, and maintains motor RPM under load increasing and load overrunning conditions, and provides closed loop control of the servo motor's rotor position, direction and speed of the servo motor utilizing signals to and from the servo motor feedback unit 5. The servo motor's rotor, i.e., the entire rotating portion of the servo motor, which is inclusive of an output shaft attached to the bi-directional hydraulic pump 1. The servo motor's 4 servo motor feedback unit 5 provides rotor speed, direction and position feedback to the servo drive unit 6B utilizing a digital encoder. The digital encoder (not shown) is a digital device within the servo motor feedback unit 5 that is connected to the end of the servo motor's 4 rotor. The digital encoder provides servo motor speed, direction and rotor angular position feedback to the servo driver unit 6B. However, the instant hydraulic actuator system 100, does not necessarily require the angular position portion of the rotor feedback information, only the rotor's speed and direction to operate. The servo motor feedback unit 5, control electronics unit 6A, and servo drive unit 6B ensure accurate RPM control under variable load conditions. Hydraulic fluid pressure is controlled or limited by regulating power input to the servo motor 4 connected to the hydraulic pump 1, which eliminates the need of either a mechanical pressure regulator or an accumulator. An accumulator is a stored energy device which stores hydraulic fluid under pressure, like a hydraulic battery. In accordance with the present invention, an accumulator may be used for Emergency Shut Down (ESD) situations but not required for normal operation. Meaning the hydraulic actuator system 100 can position its valve or device to a specified position under certain conditions such as loss of electrical power by utilizing the stored energy of the accumulator.

The present bi-directional hydraulic pump 1 and the servo motor 4 function in combination as a servo valve to control fluid flow rate and directions, consequently, eliminating the need of a servo valve.

As used herein, a solenoid valve 3 is an electromechanically operated valve. The solenoid valve 3 is controlled by an electric current through a solenoid. The use of a solenoid valve 3 enables the actuator system to hold a load in place without the servo motor 4 operation, and to not require the servo motor 4 to be running in order to maintain a position.

The servo motor/hydraulic pump (4, 1) starts several milliseconds prior to the solenoid valve 3 actuation/opening. This timing and sequencing is performed to equalize the pressure on the back side of the solenoid valve 3 with the load side so there is no momentary backwards movement.

Further, the presently claimed actuator can function in a dual mode (or Duo mode) operation, by having the ability to hold position against a load with the use of solenoid valves or to hold position without the use of any valving whatsoever. The first mode position is held by means of a hydraulic lock created within the hydraulic cylinder 2 when the solenoid valves are closed. In second mode of operation, position is held by controlling prime mover (i.e., servo motor)/hydraulic pump (4, 1) speed alone. The servo motor/hydraulic pump (4,1) rotates only at speed required to displace the internal leakage of the hydraulic pump 1 in the second mode. However, the exact pressure required to hold position is maintained with zero fluid flow to or from actuator cylinder in the first mode. The actuator's frequency response and positioning resolution are not limited by the solenoid valve's 3 response time and minimum fluid flow per response.

Because the solenoid valves are mechanical devices there is a delay or lag from when an electrical signal is sent to the solenoid valve 3 and when it actually moves or opens. This is primarily due to the physical inertia of the mechanical parts. While the delay period is extremely short, i.e., milliseconds, the delay will still affect how quickly the actuator can respond to a change in the control signal.

The frequency response is a measure of how many changes the hydraulic actuator system 100 can respond to in a given time period, the time period is generally measured in seconds, i.e., cycles per second or hertz. The less time spent lagging or waiting for solenoid action enables more actuator movement changes in a given time period or a higher frequency response.

Resolution is determined by the smallest amount of fluid the actuator can pass in a given input signal change. As the solenoid valves 3 have a lag time to open and a lag time to close, there is a minimum time period in which fluid can flow through the solenoid valve 3. This minimum amount of fluid determines the minimum amount of actuator movement or resolution when using the solenoid valves 3. Not closing or using the valves eliminates that limit to resolution and frequency response. Thus, the controller unit's 6 use or do not use the solenoid valve(s) 3 depending on the frequency of change of the input signal.

In accordance with the present invention, the sequence of operations is as follows: starting with the hydraulic actuator system 100 at rest, the controller unit's 6 control electronics unit 6A has an internal comparator device (not shown) that is continuously comparing the position of the rod 15/piston 14 within the hydraulic cylinder 2 by way of the position sensor's 22 position sensor feedback signal 22A, which is represented by a value, to that of the input control signal (4-20 mA from remote source, i.e. plant control room (not shown)) sent to the controller unit 6. When the input control signal changes and differs from the position sensor feedback signal 22A by an amount greater than the allowed deviation (exceeds deadband), the controller unit's 6 control electronics unit 6A initiates a control electronics signal 6C to the servo motor feedback unit 5 that starts the servo motor 4 moving in a particular direction. Based on the magnitude and direction change of the input control signal and the position sensor feedback signal 22A, the control electronics unit 6A first determine the servo motor 4 speed and direction, i.e., "run speed."

Second, the control electronics unit 6A sends a control electronics signal 6D to the solenoid valve(s) 3 opening to provide pressure equalization.

Third, solenoid valve(s) 3 open and within fractions of a second, i.e., at substantially the same time, the servo motor 4 ramps up to the previously determined run speed. The rod 15/piston 14 are now moving to their new commanded position and when the rod 15 is within 5 percent of its new position target, as measured by the position sensor 22 attached to the hydraulic cylinder 2, the position sensor provides a position sensor feedback signal 22A to the control electronics unit 6A, which sends a control electronics signal 6C to the servo motor feedback unit 5 thus signaling the servo motor 4 to begin a speed ramp down. Upon achieving the commanded position, the actuator maintains position by having servo the motor/hydraulic pump (4, 1) run just fast enough (very low RPM) to overcome the hydraulic pump's 1 internal leakage and maintain pressure in the hydraulic cylinder 2 while the solenoid valves (3) remain open. This is done for an adjustable period of time. Alternatively, in the inventive process of the present invention the servo motor 4 turns off when the new position is achieved and the solenoid valve's 3 adjustable time constant is satisfied. The servo motor 4 speed ramps down from full travel speed to the "lock" speed during the last "5 percent" of travel of the rod 15. The ramping is primarily there to avoid position overshoot that would be difficult to control if the motor ran at full speed all the way to the new position and then simply shut off.

If the input control signal remains within the deadband of the new position beyond the adjustable period of time, i.e., adjustable time constant, the solenoid valves (3) are closed and the servo motor 4 RPM goes to zero. The hydraulic actuator system 100 is again at rest waiting for a new input control signal change, i.e., movement command. This adjustable time constant enables the actuator to respond faster to continuous input control signal changes, as the hydraulic actuator system 100 does not have to wait for the response time of the solenoid valves (3,) opening or the pressure equalization prior to solenoid 3 opening. This increases the frequency response of the actuator for a continuously modulating application. The controller unit's 6 control electronics unit 6A are fully digital in that they convert both the analog input control signal and the analog actuator feedback signal to numeric values for the comparator to evaluate.

According to one embodiment of the invention, the servo motor 4 has a Hall Effect servo motor feedback unit 5 that sends rotor speed and direction information from the servo motor feedback unit 5 to the servo motor drive 6B.

Figure 2:
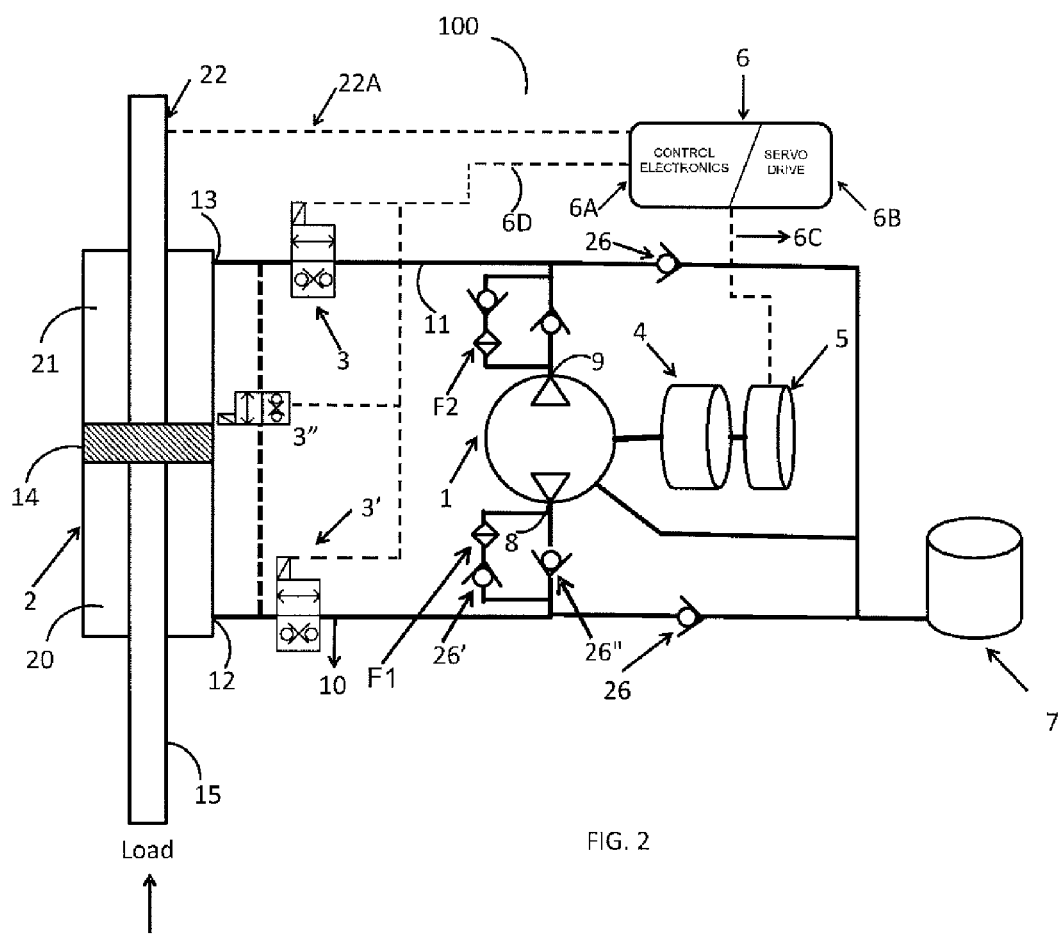
FIG. 2 is a schematic view of another preferred embodiment of a self-contained energy efficient hydraulic actuator system.

The principles and operation of a self-contained energy efficient hydraulic actuator system according to the present invention may be better understood with reference to the FIGS. 1 and 2 and the accompanying description.

FIG. 1 illustrates a self-contained energy efficient hydraulic actuator system that includes a bi-directional hydraulic pump 1, a hydraulic cylinder 2, a solenoid valve 3, a servo motor 4 all of which are controlled by controller unit 6, which comprises a control electronics unit 6A and servo drive unit 6B.

The bi-directional hydraulic pump 1 has a first port 8 and a second port 9, and has the capability of pumping fluid in either direction. The first port 8 and the second port 9 are connected to a first hydraulic fluid line 10 and a second hydraulic fluid line 11, respectively. The first hydraulic fluid line 10 and the second hydraulic fluid line 11 further communicate with the hydraulic cylinder 2 through a first cylinder port 12 and a second cylinder port 13, respectively. The hydraulic cylinder 2 includes a piston 14 and a rod 15 attached to the piston 14, and the piston 14 divides the inside of the hydraulic cylinder 2 into a first chamber 20 and a second chamber 21. The first cylinder port 12 and the second cylinder port 13 are located at the opposite ends of the hydraulic cylinder 2 and in connection with the first chamber 20 and the second chamber 21, respectively. As the bi-directional hydraulic pump 1 pumps the hydraulic fluid out the second port 9, the hydraulic fluid moves into the second chamber 21 through the second line 11 and the second cylinder port 13, and the piston 14 moves toward the first chamber 20 (or against the load); at the same time, the hydraulic fluid moves out the first chamber 20, travels through the first cylinder port 12 and the first line 10, and enters into the hydraulic pump 1 thorough the first port 8. When the bi-directional hydraulic pump 1 changes direction, the hydraulic fluid is pumped out the first port 8, and drives piston 14 moving toward the second chamber 21. The bi-directional pump 1 controls the movement and position of the piston 14 by altering the difference in pressure between the two sides of the piston 14. In one of the preferred embodiments, the bi-directional hydraulic pump 1 is a reversible gear pump. It is also preferred that the hydraulic cylinder 2 uses a double rod ended piston 14 to provide equal annular area on both faces of the piston 14 to maintain equal volume when the piston 14 moves to either direction in the hydraulic cylinder 2.

A servo motor 4 is ideally suited to control the hydraulic pump (bi-directional pump) 1 for this application due to its ability to reverse direction, vary speed, and maintain fixed RPM, rapidly and continuously without duty cycle limitations. Thus, the servo motor 4 can provide unlimited start/ stop and accelerating/de-accelerating (modulating duty) functions without the down time required by, for example, induction motors that have duty cycle limitations.

The servo motor's abilities are crucial to the claimed invention, as it allows a controlled variable rate dissipation of energy when the actuator is operating. Therefore, it is critical to use a servo motor 4 that is configured to produce rated torque from zero RPM to a maximum rated RPM under load, as well as a servo drive unit 6B, which is required to operate the servo motor 4. The servo motor 4 has servo motor feed-back unit 5, that provides rotor speed and rotor direction feedback via its digital encoder to the servo drive unit 6B via a feedback signal 6C, which would ensure accurate RPM control under variable load conditions. Specifically, based on the feedback signal 6C from the servo motor feed-back unit 5, the servo drive unit 6B maintains servo motor RPM under load increasing and load overrunning conditions, and provides closed loop control of rotor direction and rotor speed. Essentially, the hydraulic pump 1 and the servo motor 4 function in combination as a directional servo valve to control fluid flow rate and directions, consequently, the combination eliminates the need for a servo valve. In one of the preferred embodiments, the servo motor 4 is an AC brushless permanent magnet motor.

Hydraulic fluid pressure is controlled or limited by regulating power input to the bi-directional hydraulic pump 1, via the servo motor 4, which eliminates the need of either a mechanical pressure regulator or an accumulator.

A solenoid valve 3 is configured so as to control fluid communication between the hydraulic cylinder 2 and the bi-directional hydraulic pump 1.

The use of a solenoid valve 3 enables the actuator system to hold a load in place without servo motor 4 operations, and to not require the servo motor running in order to maintain a position of the actuator. Such ability minimizes the energy consumption and extends the lifetime of the servo motor 4 and bi-directional hydraulic pump 1.

This hydraulic actuator system also has the capability of dual-mode operation, wherein the actuator can hold a position against a load with or without the use of a solenoid valve 3. In the first mode, the position of the piston (15, 22) is held by means of a hydraulic lock created within the hydraulic cylinder 2 when the solenoid valve 3 is closed. In the second mode of operation, the piston (15, 22) is held by controlling the servo motor 4 and the bi-directional hydraulic pump's 1 speed. Servo motor 4 and hydraulic pump 1 rotate only at the speed required to displace the internal leakage of the hydraulic pump 1, and maintain the exact pressure required to hold position with zero fluid flow from or to hydraulic cylinder 2. Frequency response and positioning accuracy are not limited by solenoid valve 3 response time and minimum fluid flow per response.

The actuator system further includes a controller unit 6, which comprises a control electronics unit 6A. As used herein, the control electronics unit 6A may include a manual or automatic means for starting and stopping the servo motor, selecting forward or reverse rotation, selecting and regulating the speed, regulating or limiting the torque, and protecting against overloads and faults.

The controller unit 6 (comprising the control electronics unit 6A and servo drive unit 6B) receives piston sensor feedback signals 22A from the hydraulic cylinder 2 position sensor 22 and sends and/or receives control electronics signals 6D to the solenoid valve(s) 3 and control electronics signals 6C to the servo motor feedback unit 5. Thus, the controller unit 6 has the capability to operate both the servo motor 4 and solenoid valve(s) 3, simultaneously so that the servo motor 4 and solenoid valve(s) 3 start/stop and open/close, respectively.

The controller unit's 6 control electronics unit 6A can be programmed to simultaneously (within milliseconds) close the solenoid valve 3 and stop the servo motor 4, and alternatively open the solenoid valve 3 and have the servo motor 4 produce rated torque from zero RPM to a maximum rated RPM under load, at virtually the same time. The control electronics unit 6A also have the capability of receiving a piston sensor feed signal 22A from a position sensor 22 attached to the hydraulic cylinder 2; by sensing the position of the piston/rod, 14, 15 and/or hydraulic cylinder 2, the control electronics unit 6A can send control electronics signals to the servo drive unit 6B and control the direction and speed of the servo motor 4. Thus, the servo motor 4 and bi-directional hydraulic pump 1 starts several milliseconds prior to the solenoid valve(s) 3 actuation/opening. This timing and sequencing is done to equalize the pressure on the back side of the solenoid valve(s) 3 with the load side so there is no momentary backwards movement. In essence, the servo motor 4 initiates pressure in a fraction of a second prior to the opening of the solenoid valve(s) 3, thus avoiding an initial momentary drop in hydraulic pressure within the system.

A hydraulic fluid reservoir 7 is preferred, but not required. When used, the hydraulic fluid reservoir 7 is sealed and only of a volume required to make up for volume change due to thermal expansion and contraction of the hydraulic fluid and the system. As the actuator system operates, fluid is not pumped into or out of the reservoir 7, only from one side of the hydraulic cylinder 2 to the other. A sealed hydraulic actuator system eliminates all external sources of fluid contamination which minimizes the need for periodic fluid change.

FIG. 2 provides schematic view of another preferred embodiment of the self-contained energy efficient hydraulic actuator system that includes a bi-directional hydraulic pump 1, a hydraulic cylinder 2, a solenoid valves 3, 3', 3" a servo motor 4 all of which are controlled by a controller unit 6, which comprises a control electronics unit 6A and servo drive unit 6B. FIG. 2 also provides check valves comprising suction check valves 26, which are used to maintain the internal hydraulic fluid pressure inside the actuator system. As depicted in FIG. 2, the check valves 26' and 26" may be used to prevent backflow through the filter F1. Similarly, other check valves maybe used to prevent back flow through filter F2.

As mentioned above, the servo motor 4 has servo motor feed-back unit 5, that provides rotor speed and position feedback signal 6C to the controller unit's 6 servo drive unit 6B, which would ensure accurate RPM control under variable load conditions. Specifically, based on the position feedback signal 6C from the servo motor feed-back unit 5, the servo drive unit 6B maintains motor RPM under load increasing and load overrunning conditions, and provides closed loop control of rotor position and speed.

A solenoid valve 3 is configured so as to control fluid communication between the hydraulic cylinder 2 and the hydraulic pump (bi-directional pump) 1. As mentioned above, the control electronics unit 6A has the capability to operate both the servo motor 4 and solenoid valve(s) 3 so that the servo motor 4 and solenoid valve(s) 3 start/stop and open/close, respectively. FIG. 2, also depicts a hydraulic fluid reservoir 7, which is preferred, but not required.

FIG. 2 also depicts a second solenoid valve 3' which may be added to the other end of the hydraulic cylinder 2 to maintain the pressure inside the hydraulic cylinder 2. An emergency shutdown loop can also be introduced using a third solenoid valve 3"; under emergency situation, the solenoid valve 3" is open, and the hydraulic fluid bypasses the hydraulic pump 1 and solenoid valves 3, 3" and travels directly from one side of the hydraulic cylinder 2 (i.e., second chamber 21) to the other side of the hydraulic cylinder 2 (i.e., first chamber 20). Solenoid valves 3, 3' and 3" receive control electronics signals from the control electronics unit 6A depicted via dotted line 6D in FIG. 2. Solenoid valve 3" also optionally communicates with the first line 10 and second lines 11 via a bold dotted line for the purpose of Emergency Shut Down (ESD).

The self-contained energy efficient hydraulic actuator system 100 integrates all components together, and is mounted as one unit on a device or a valve requiring mechanical motion. It can also be designed as a modular unit, and can be assembled from standard subassemblies, and a complete actuator is produced by selecting the appropriate power unit and hydraulic cylinder 2 to meet the application force and speed requirements.

The energy efficiency of the presently claimed actuator system is compared to the prior art systems in the following illustrative prophetic examples.

When comparing energy consumption between the claimed actuator system and actuator systems of the prior art many variables both in the design of the actuator and its application must be considered. Motor, and thus actuator efficiency is highly dependent on load and speed that the motor operates at. In order to account for these many variables between the systems of the Examples the following considerations were included in the energy consumption calculations: a 50% actuator movement duty cycle, i.e., the actuator(s) moves 50% and is at rest 50% of the calculated time period; when the actuator is operating or moving it is operating at full and steady load, or its prime mover (motor) is producing its rated output or horsepower; the Examples are based on an operation schedule that is 24 hours a day, 7 days a week, and for 1 year; Example 1's servo motor efficiency at full output equals 85%; Examples 2 and 3 have AC induction motors with efficiency at full output (rated RPM) of 80%, and at ¼ of rated RPM their AC induction motor efficiency is 75%; the system of Example 3 runs 100% RPM with varying load, a 100% load when the actuator is moving, a 20% load when at rest, and a 70% motor efficiency at the 20% load; the system of Example 2 runs the motor continuously with varying RPM, 100% RPM while actuator is moving and 25% motor RPM when actuator is stationary.

Examples 1 through 3 are operating on same voltage, i.e., 220 VAC, 3 phase, 1 hp equals 745 watts, and power consumed is in kilowatt hours (kWh).

Power used by the control electronics is left out of all three Examples based on the principle that they all consume about the same amount of power. All three Examples have the same motor hp output for all actuators based on the same load.

Example 1: Is based on the inventive actuator system's power usage in watts;

(1.5 hp/0.85 eff.)×(745 w/hp)=1,314 watts (1,314 watts)×(365 days)×(24 hrs)/1000=11,510 kWh 11,510 kWh/50%=5,755 kWh/yr Example 2 : Is based on power usage in watts of an actuator system as presented in published U.S. Patent Application No. 2007/0101711;

(1.5 hp/0.80 eff.)×(745 w/hp)=1,396 watts (1,396 watts)×(365 days)×(24 hrs)/1000 (0.5 on time)=6,114 kWh +(1.5 hp/0.75 eff)×(745 w/hp)×((365 days)×(24 hrs)/1000)×(0.5 off time) =12,640 kWh/yr Example 3: Is based on power usage in watts of an actuator system as presented in U.S. Pat. No. 7,640,736;

(1.5 hp/0.80 eff.)×(745 w/hp)=1,396 watts (1,396 watts)×(365 days)×(24 hrs)/1000 (0.5 on time)=6,114 kWh+(1.5 hp/0.70 eff)×(745 w/hp)×((365 days)×(24 hrs)/1000)×(0.5 off time)=13,106 kWh/yr The Examples have been prepared with the understanding that for true energy consumption comparisons, data would be have sourced from actual installations with comparable situations. However, it is the ability of the present inventive actuator system to shut the motor off when the actuator is not moving that provides tremendous efficiencies. The power usage of the presently claimed actuator system, as presented in Example 1, provides for a significant energy efficiency over time. Remarkably, Example 1 provides more than 50 percent reduction in power usage over the calculated period.

The description has not attempted to exhaustively enumerate all possible variations. That alternate embodiments may not have been presented for a specific portion of the invention, and may result from a different combination of described portions, or that other non-described alternate embodiments may be available for a portion, is not to be considered a disclaimer of those alternate embodiments. It will be appreciated that many of those non-described embodiments are within the literal scope of the following claims, and others are equivalent.

What is claimed is:

1. A hydraulic actuator system comprising:
   at least one piston;
   at least one bi-directional hydraulic pump in fluid communication with the piston to provide hydraulic fluid to the piston and to control the position of the piston, the pump having at least one hydraulic fluid inlet and at least one hydraulic fluid outlet;
   a motor operatively coupled to the pump to drive the pump;
   at least one solenoid valve configured to control the hydraulic fluid between said piston and said bi-directional pump, and
   a controller for controlling the solenoid valve and motor, wherein the position of the piston can be maintained when the motor is not driving the pump, the motor can accelerate from zero to a maximum revolutions per minute (RPM) under load, and said motor coupled to the pump starts a fraction of a second prior to opening the solenoid valve and said motor coupled to the pump stops a fraction of a second after closing the solenoid valve.

2. The system of claim 1, wherein the controller comprises a control electronics unit and a drive unit.

3. The system of claim 1, wherein the motor at zero RPM does not utilize energy.

4. The system of claim 1, wherein the controller can sequentially open the at least one solenoid valve and start the motor, or close the at least one solenoid valve and stop the motor.

5. The system of claim 1, wherein the piston is contained in a hydraulic cylinder.

6. The system of claim 5, wherein the hydraulic cylinder has a position sensor.

7. The system of claim 6, wherein the controller is configured to sequentially receive a signal from a sensor and the motor feedback unit and to send control signals to the motor and the at least one solenoid valve.

8. The system of claim 7, wherein said controller is configured to receive feedback signals from the motor.

9. The system of claim 5, wherein the hydraulic cylinder comprises a first and a second chamber.

10. The system of claim 5, wherein the hydraulic cylinder comprises a first cylinder port and a second cylinder port.

11. The system of claim 1, wherein the piston comprises at least one rod.

12. The system of claim 1, wherein the at least one solenoid valve is configured to hold a load without the motor running.

13. The system of claim 1, wherein the motor comprises a motor feedback unit.

14. The system of claim 1, wherein said motor is a AC and/or DC brushless permanent magnet motor.

15. The system of claim 1, wherein the pump is in fluid communication with the piston by way of a first hydraulic fluid line and a second hydraulic fluid line.

16. The system of claim 1, further comprising a sealed reservoir that is configured to make up for volume change due to thermal expansion and contraction of the hydraulic fluid and system.

17. The system of claim 1, wherein said motor has from about 0.1 horsepower to about 10.0 horsepower, from about 3 to about 325 inch pounds of torque, and a maximum RPM of about 4000 to about 5000.

18. The system of claim 1, wherein the bi-directional hydraulic pump has a displacement of about 0.0080 to about 0.55 cubic inches per revolution .

19. The system of claim 1, further comprising at least one suction check valve and optionally at least one filter.

20. A method for reducing the energy consumption of a hydraulic actuator system comprising a motor and at least one solenoid valve, said method comprising the steps of: receiving, at the controller, input signals corresponding to a desired operation of the functions of the system; determining by the controller an operating limit; and controlling sequentially the motor and at least one solenoid valve of the hydraulic actuator system of claim 1.

21. The system of claim 1, wherein said actuator system is a self-contained hydraulic actuator system.

22. The system of claim 1, wherein said actuator system provides an output that is linear, rotary, or oscillatory motion.

23. The system of claim 1, wherein the motor is a servo motor.

24. A method of reducing the energy consumption of a hydraulic actuator system, said method comprising the steps of:
  i) receiving, at a controller, input signals corresponding to a desired operation of the functions of the system,
  ii) determining by the controller an operating limit for the system; and
  iii) controlling a motor and at least one solenoid valve sequentially at the operating limit, wherein the hydraulic actuator system comprises least one piston; at least one bi-directional hydraulic pump in fluid communication with the piston to provide hydraulic fluid to the piston and to control the position of the piston, the pump having at least one hydraulic fluid inlet and at least one hydraulic fluid outlet; the motor operatively coupled to the pump to drive the pump; the at least one solenoid valve configured to control the hydraulic fluid between said piston and said bi-directional pump, and said controller controls the at least one solenoid valve and motor, wherein the position of the piston can be maintained when the motor is not driving the pump, the motor can accelerate from zero to a maximum revolutions per minute (RPM) under load, and said motor coupled to the pump starts a fraction of a second prior to opening the solenoid valve and said motor coupled to the pump stops a fraction of a second after closing the solenoid valve.

25. The method of claim 24, wherein the motor at zero RPM does not utilize energy.

26. The method of claim 24, wherein the controller can sequentially start the motor and open the at least solenoid valve, or close the at least one solenoid valve and stop the motor.

27. The method of claim 24, wherein said actuator system is a self-contained hydraulic actuator system.

28. The method of claim 24, wherein said actuator system provides an output that is linear, rotary, or oscillatory motion.

29. The method of claim 24, wherein the motor is a servo motor.

\* \* \* \* \*